(12) United States Patent
Ishida et al.

(10) Patent No.: US 7,178,569 B2
(45) Date of Patent: Feb. 20, 2007

(54) RUNFLAT TIRE SYSTEM AND SUPPORT RING THEREFOR

(75) Inventors: Takaaki Ishida, Kobe (JP); Masatoshi Tanaka, Kobe (JP); Yurie Tanami, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 10/856,946

(22) Filed: Jun. 1, 2004

(65) Prior Publication Data
US 2004/0244892 A1    Dec. 9, 2004

(30) Foreign Application Priority Data
Jun. 9, 2003  (JP) .............................. 2003-164261

(51) Int. Cl.
B60C 17/06    (2006.01)
B60C 17/04    (2006.01)
(52) U.S. Cl. ...................................... 152/158; 152/520
(58) Field of Classification Search ................ 152/158, 152/520, 5, 7, 11, 12, 516, 156, 324, 323, 152/325
See application file for complete search history.

(56) References Cited

U.S. PATENT DOCUMENTS 1,008,772 A * 11/1911 Andrew .................. 152/158 X
3,509,928 A    5/1970 Aghnides
3,844,325 A * 10/1974 Betancourt ................ 152/158
4,921,029 A    5/1990 Palinkas et al.
5,139,066 A *  8/1992 Jarman .......................... 152/7
5,885,383 A *  3/1999 French ........................ 152/158
6,564,842 B2 * 5/2003 Abinal et al. ........... 152/520 X

FOREIGN PATENT DOCUMENTS

JP              03082601 A  *  4/1991
JP              7-32827 A       2/1995
WO       WO 89/05736 A1       6/1989
WO       WO 00/76791 A1      12/2000

* cited by examiner

Primary Examiner—Adrienne C. Johnstone
(74) Attorney, Agent, or Firm—Birch, Stewart, Kolasch & Birch, LLP

(57) ABSTRACT

A support ring for a runflat tire system which comprises an annular body made of an elastic material having a radially inner circumferential surface which fits to a mounting portion of a wheel rim when mounted thereon, and a radially outer circumferential surface which comes into contact with the inside of the tread portion of a pneumatic tire mounted on the wheel rim when the tire is deflated and loaded, wherein the outer circumferential surface is wider in the axial width than the inner circumferential surface, and in a cross section including the central axis of the support ring, the outline of the annular body is substantially a trapezoidal shape of which two parallel long and short sides are the outer and inner circumferential surfaces, respectively, and the remaining two sides are inclined at acute angles with respect to the long side.

8 Claims, 8 Drawing Sheets

Ex.1~2

Ref.1

Ref.2

RUNFLAT TIRE SYSTEM AND SUPPORT RING THEREFOR

This Nonprovisional application claims priority under 35 U.S.C. § 119(a) on Patent Application No(s). 2003-164261 (PAT) filed in Japan on Jun. 9, 2003, the entire contents of which are hereby incorporated by reference.

BACKGROUND OF THE INVENTION

1. Field of the Invention

The present invention relates to a runflat tire system, more particularly to a support ring disposed inside a pneumatic tire to support the backside of the tread of the deflated tire to increase the runflat distance.

2. Related Art

In recent years, a runflat tire system by which, even if the tire goes flat, it is possible to travel for a very long distance for example several hundred kilometers at a relatively high speed of up to about 80 km/hr has been proposed. Such techniques are disclosed in the Japanese patent application publication NOS. 8-504389 (WO 94/13498 A1), 10-6721 (U.S. Pat. No. 5,891,279 A) and 2001-354002 (U.S. Pat. No. 6,415,839 B1).

FIG. 11 shows an assembly of a pneumatic tire 2, wheel rim 3 and a support ring disclosed in the above-mentioned publications. In this assembly, even if the tire be punctured, it is possible to travel for a relatively long distance at usual speed. However, the steering stability in runflat mode is not so good. This is especially true when the tire goes flat during high speed running. Thus, there is room for improvement.

The inventors therefore, made a study on the correlation between the runflat steering stability and the parameters of the support ring, and found that the stability can be improved by: increasing the contact area of the support ring with the inside of the tire tread portion; increasing the lateral rigidity of the support ring; and increasing the torsional rigidity the support ring around the vertical axis. These must be achieved without increasing the weight of the support ring and without losing the radial rigidity and durability because these are the fundamental requirements of the support ring.

It is therefore, an object of the present invention to provide a support ring for a runflat tire system, by which the runflat steering stability can be improved, and thereby safe and long distance traveling is possible in runflat mode.

BRIEF SUMMARY OF THE INVENTION

According to one aspect of the present invention, a support ring comprises an annular body made of an elastic material having a radially inner circumferential surface and a radially outer circumferential surface, wherein the outer circumferential surface is wider in the axial width than the inner circumferential surface, and in a cross section including the rotational axis of the support ring, the outline of an annular body is substantially a trapezoidal shape of which two parallel long and short sides are the outer and inner circumferential surfaces, respectively and the remaining two sides are inclined at acute angles with respect to the long side.

Embodiments of the present invention will now be described in detail in conjunction with the accompanying drawings.

DETAILED DESCRIPTION OF THE INVENTION

Figure 1A:
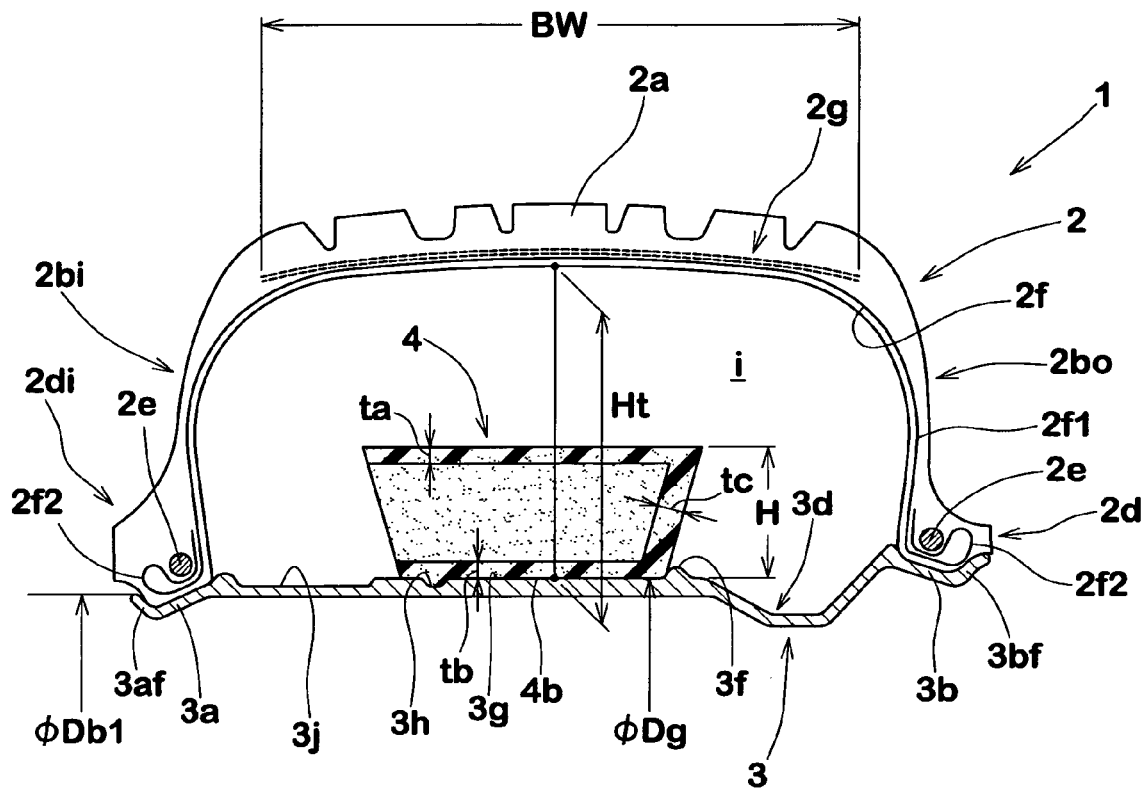
FIG. 1(a) and FIG. 1(b) are cross sectional views of an assembly of a tire, wheel rim and support ring according to the present invention showing a normally inflated state and a deflated state in the ground contacting patch, respectively.

In the drawings, runflat tire system 1 according to the present invention comprises a pneumatic tire 2, a wheel rim 3 and a support ring 4 disposed inside the tire 2.

The pneumatic tire 2 has a low aspect ratio and comprises: a tread portion 2a; a pair of axially spaced bead portions (2do and 2di) each with a bead core 2e therein; a pair of sidewall portions (2bo and 2bi); a carcass 2f extending between the bead portions through the tread portion and sidewall portions; and a tread reinforcing belt 2g disposed in the tread portion 2a.

In order to use the tire 2 without a tire tube, the inner surface of the tire is covered with air-impermeable rubber which is provided as so called inner liner or carcass ply topping rubber.

The bead core 2e is formed by winding a nonextensible wire such as steel wire.

The carcass 2f comprises a radial ply of cords. The ply extends between the bead portions (2do and 2di) beyond the bead core 2e to the axially outside thereof in each bead portion through the radially inside of the bead core 2e, and then the ply is turned back radially outwardly to the axially inside of the bead core 2e, passing between the carcass ply main 2f1 and the bead core 2e, as shown in FIG. 1(a), so as to form a loop 2f2 filled with rubber. The turnback portion extends radially outwards along the carcass ply main 2f1 and then terminates in the bead portion so that the edge is positioned at a radial position slightly radially outside the radially outer end of the bead core. Therefore, when the tension is applied to the carcass ply main portion 2f1, the loop 2f2 is pulled axially inwards. AS the loop 2f2 has rubber therein, it functions as a wedge driven into the narrow space between the bead core and bead seat. Thus, the carcass ply is firmly locked.

The belt 2g comprises at least two cross plies of high modulus cords such as steel cords disposed radially outside the carcass 2f in the tread portion 2a.

The wheel rim 3 comprises: a first bead seat 3a and flange 3af for the bead portion 2di; a second bead seat 3b and flange 3bf for the bead portion 2do; a rim well 3d provided near to the second bead seat 3b which is used when mounting the tire; a mounting portion 3g for the support ring 4 provided between the rim well 3d and the first bead seat 3a; a hump 3f formed along the axial edge of the mounting portion 3g on the rim well side; and a groove 3h provided in the mounting portion 3g near the other axial edge of the mounting portion 3g.

The first and second bead seats 3a and 3b are tapered axially outwards contrary to the conventional wheel rims whose bead seats are tapered towards the axial center (tire equator).

The first and second flanges 3af and 3bf are inclined axially outwards contrary to the conventional flanges (main portion contacting with the bead) are almost perpendicular to the axial direction.

In this embodiment, as the inside diameter of the bead portion 2di is smaller than that of the bead portion 2do, the first bead seat 3a is accordingly made smaller in diameter than the second bead seat 3b.

The mounting portion 3g is substantially centered on the center of the axial width of the rim or the axial center of the tread width of the tire.

The diameter Dg of the mounting portion 3g is more than the diameter Db1 of the flange 3af of the first bead seat 3a.

The hump 3f is formed between the support ring mounting portion 3g and the rim well 3d, and extends continuously in the circumferential direction so as to function as a stopper for preventing the axial displacement of the support ring 4 towards the rim well as well as positioning the support ring.

Also, a circumferentially continuously extending hump is formed at the axially inner end of each bead seat 3a, 3b.

The groove 3h extends continuously in the circumferential direction.

Further, in order to make it easy to slide the support ring during mounting operation, between the mounting portion 3g and the first bead seat 3a, namely, on the same side of the groove 3h, a wide groove 3j as deep as the groove 3h is formed to extend axially from the mounting portion 3g to the hump at the edge of the first bead seat 3a.

Figure 1B:
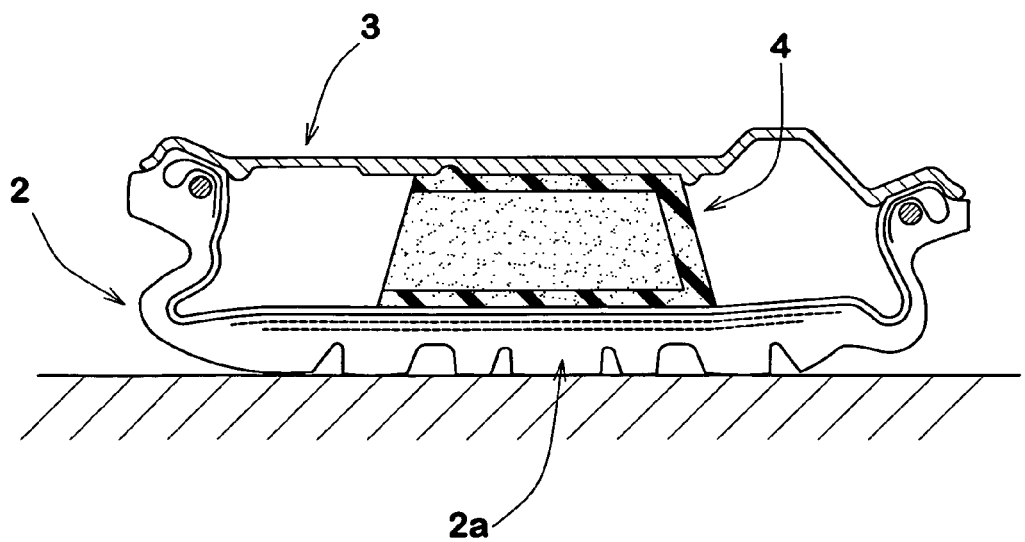

The support ring 4 comprises an annular body made of an elastic material and comprising: a radially inner annular portion 6 secured to the wheel rim 3; a radially outer annular portion 5 coming into contact with the inside of the tread portion when the tire goes flat as show in FIG. 1(b); and a supporting wall portion 7 bridging between the inner and outer annular portions 6 and 5, while circumferentially extending in a zigzag manner, especially in a double-zigzag manner in this embodiment.

It is preferable for the durability that the elastic material has a hardness of from 30 to 70, a 10% modulus of from 30 to 150 MPa, a loss tangent (tan delta) of from 0.01 to 0.10. Here, the hardness means the durometer type-D hardness measured according to Japanese Industrial Standard JIS-K6253 at a temperature of 23±2 degrees C. The 10% modulus is measured according to JIS-K6251 at the same temperature as above. The loss tangent is measured with a viscoelastic spectrometer under the following conditions: frequency of 10 Hz; temperature of 100 deg. C.; initial elongation of 10%; and dynamic strain amplitude of ±0.25%.

For example, polyurethane, rubber, EPDM and the like can be used as the elastic material. In this embodiment, the support ring 4 is formed as a casting of polyurethane.

In the cross section including the central axis or rotational axis (thus, corresponding to the tire meridian section), the outer annular portion 5 and inner annular portion 6 each have a rectangular cross sectional shape long in the axial direction.

The thicknesses (ta and tb) of the annular portions 5 and 6, respectively, are set in the range of not less than 2 mm, preferably more than 4 mm, but not more than 10 mm, preferably less than 6 mm in the radial direction in order to provide necessary rigidity.

The radially inner circumferential surface 4b of the inner annular portion 6 is provided with a protrusion 4c which accommodates to the above-mentioned groove 3h of the wheel rim 3. Excepting the protrusion 4c, the radially inner circumferential surface 4b has an inside diameter of which value is constant and slightly smaller than the outside diameter Dg of the mounting portion 3g of the wheel rim 3. In other words, the inside diameter of the support ring 4 is slightly smaller than the outside diameter Dg of the mounting portion 3g of the wheel rim 3. Thus, when mounted, the support ring 4 can fit tightly to the mounting portion 3g due to the elastic deformation of the support ring 4.

In connection with the outside diameter of the support ring 4, on the other hand, as shown in FIG. 1(a), the radial height H of the support ring 4 is set in the range of not less than 30%, preferably more than 40%, but not more than 70%, preferably less than 60% of the radial height Ht of the tire cavity. Here, the heights H and Ht are defined as follows under such a condition that the support ring 4 and the tire 2 are mounted on the wheel rim 3 and the tire is inflated to a normal pressure (design pressure) and loaded with no tire load: the radial height H of the support ring is measured in the radial direction from the mounting portion 3g to the radial outmost point of the support ring 4; and the radial height Ht of the tire cavity is measured in the radial direction from the mounting portion 3g to the radially outmost point on the inner surface of the tread portion.

If the radial height H is too high, the support ring is very liable to contact with the inside of tread portion 2a during normal running, and not only ride comfort but also steering stability and the like are deteriorated. Thus, the radial height H should be at most 70%. If the radial height H is too low, under runflat mode, the sidewall portion 2b comes into contact with the road surface and wears to decrease the durability and runflat distance. Thus, the radial height H should be at least 30%.

Figure 4:
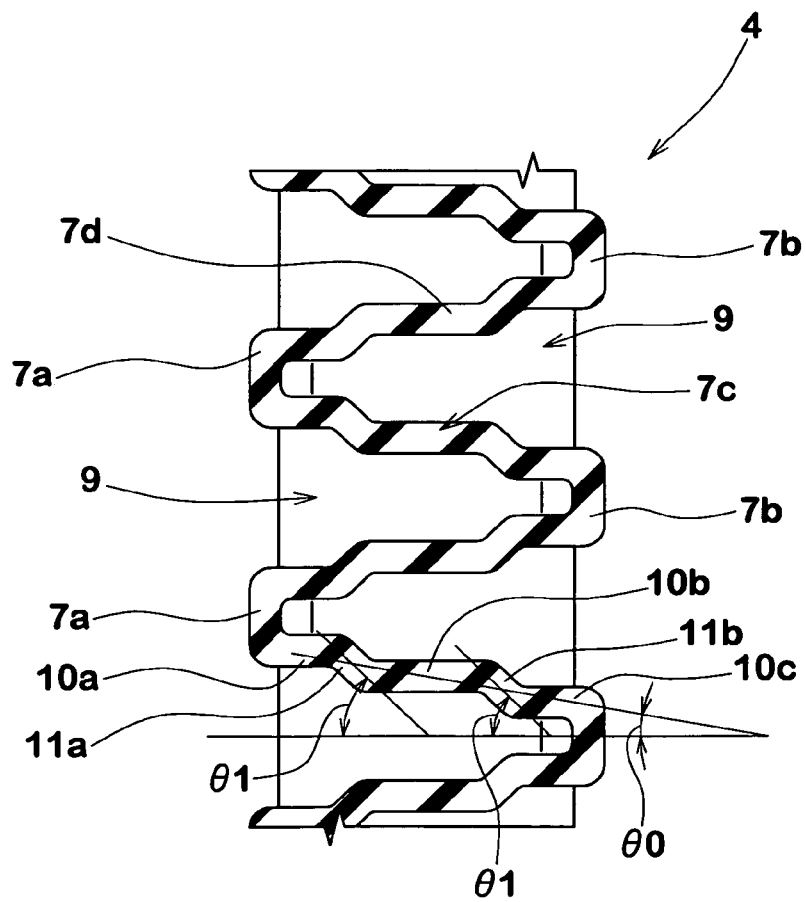
FIG. 4 is a developed sectional view taken on line A—A in FIG. 3.

The supporting wall portion 7 extends radially outwardly from the inner annular portion 6 to the outer annular portion 5 as a radial support, while extending continuously in the circumferential direction in a zigzag fashion, whereby the supporting wall portion 7 is, as shown in FIG. 4, made up of alternate traverse walls 7c and 7d and relatively short circumferential walls 7a and 7b.

The thickness tc of the supporting wall portion 7 is preferably set in a range of from 5 to 15 mm.

Figure 2:
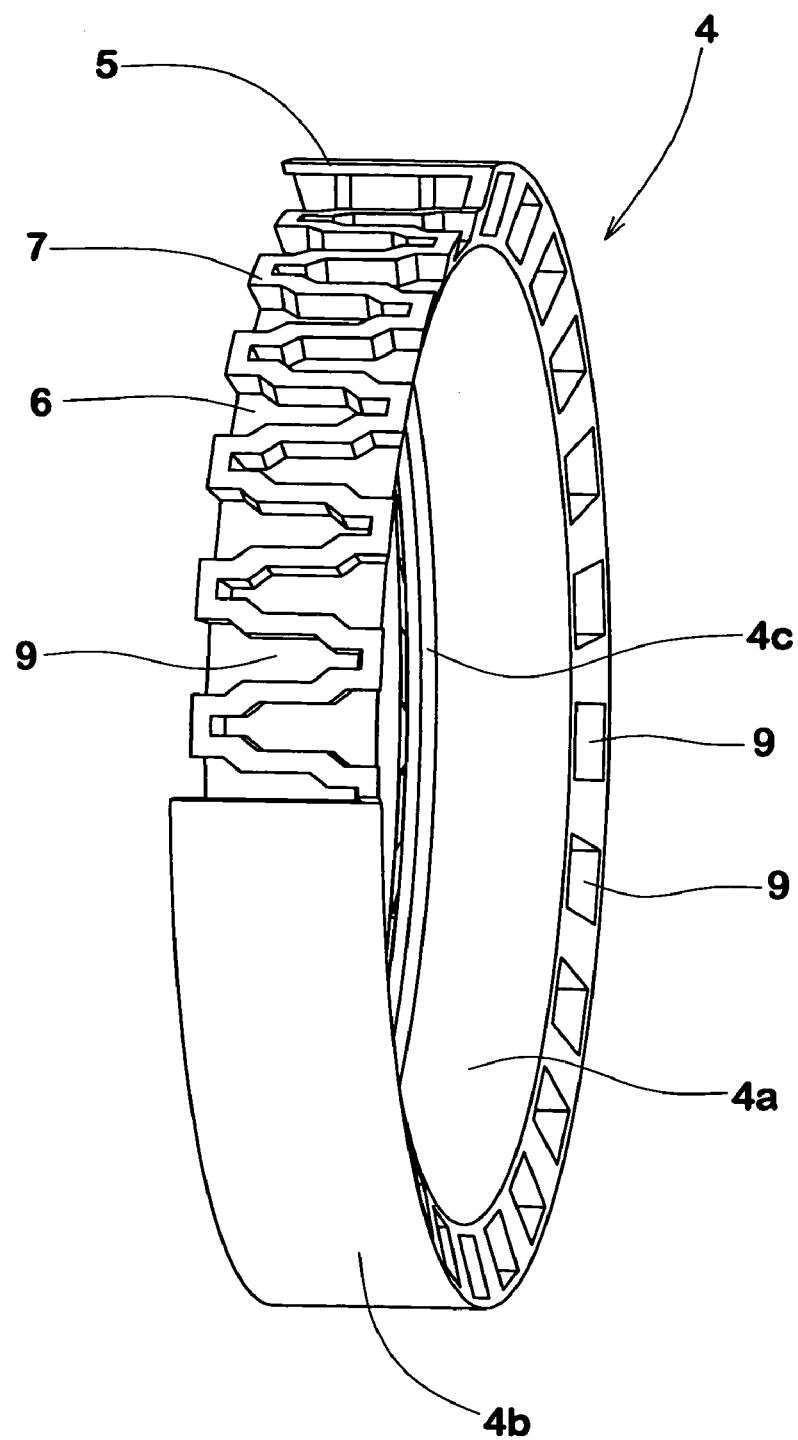
FIG. 2 is a schematic perspective view of a support ring.
Figure 3:
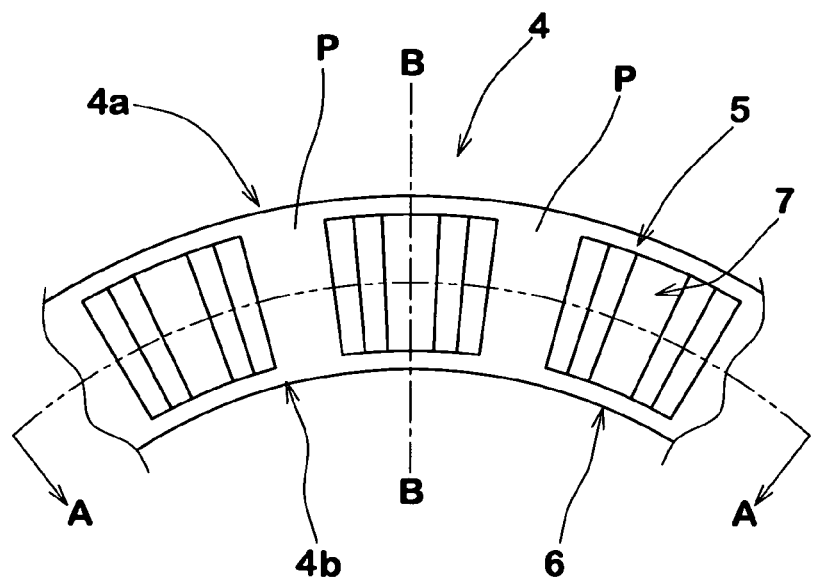
FIG. 3 is a partial side view thereof.

The traverse walls 7c and 7d each extend from one side to the other side of the support ring 4 fully across the axial width of the support ring. The circumferential walls 7a and 7b each extend between the axial ends of the circumferentially adjacent traverse walls 7c and 7d. As a result, the support ring 4 has hollows 9 which open on both the side faces as shown in FIG. 3, and the openings are staggered as shown in FIG. 2.

On one side of the support ring 4, the circumferential pitches of the openings defined between the centers (centroid) thereof are preferably set in a range of from about 15 to about 55 mm.

In this embodiment, the traverse walls 7c and 7d are both inclined with respect to the axial direction as shown in Fi. 4. All the alternate traverse walls 7c are inclined to the same direction. The remaining other set of the alternate traverse walls 7d are inclined to the same direction which is however reverse to that of the walls 7c. Thus, from the opening to the bottom of the hollow 9, the sectional area of the hollow when viewed from one side of the support ring 4 is gradually decreased by gradually decreasing the width in the circumferential direction while keeping the height in the radial direction at a substantially constant value.

In this embodiment, further, the alternate traverse walls 7c and 7d are each formed in a zigzag fashion to increased the rigidity without increasing the material weight. Thus, the supporting wall portion as a whole is a double-zigzag wall.

In the example shown in FIG. 4, each traverse wall 7c, 7d is made up of axial parts 10a, 10b and 10c and oblique parts 11a and 11b therebetween. The axial parts 10a, 10b and 10c are substantially parallel with the axial direction. The oblique parts 11a and 11b are inclined towards the same direction as the overall inclining direction of the traverse wall. The number of the axial parts is three or more, preferably at most five. The number of oblique parts is the number of the axial parts minus one. For example, the inclining angle (theta 1) of the oblique parts 11a and 11b is set in the range of about 40 to about 50 degrees with respect to the axial direction, and the angle (theta 0) of the overall inclining direction of the traverse wall is set in the range of from about 10 to about 15 degrees with respect to the axial direction. Here, the overall inclining direction is represented by that of a straight line drawn between the axial ends of the traverse wall. (theta 0)>(theta 1)

Due to such a double-zigzag configuration, the supporting wall portion is effectively increased in the compressive rigidity against radial load, and bending rigidity against lateral load. Thus, the lateral rigidity, torsional rigidity and radial rigidity can be effectively increased without increasing the material weight.

The outer annular portion 5 is wider in the axial width than the inner annular portion 6.

Figure 5:
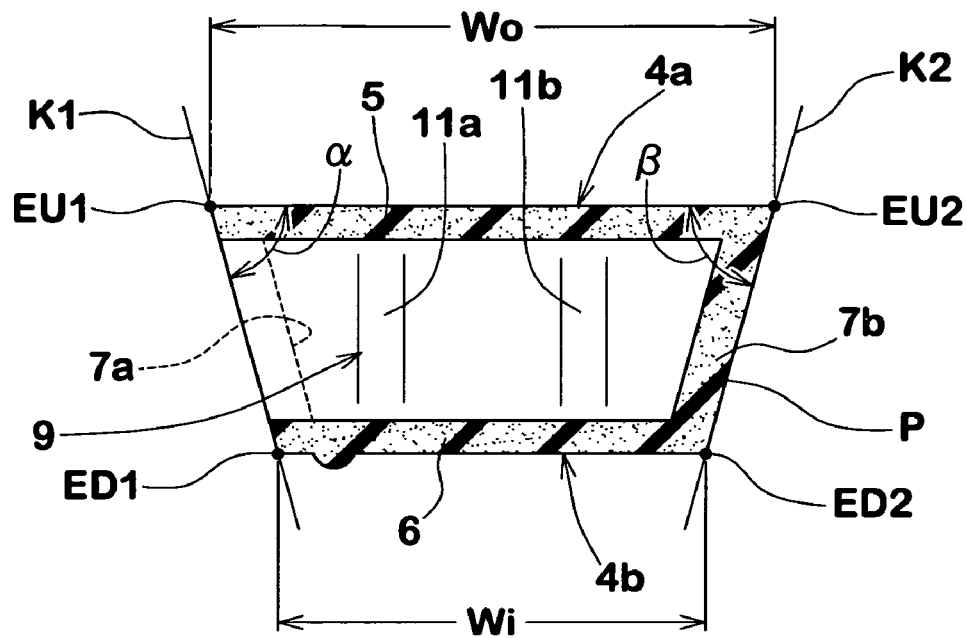
FIG. 5 is a cross sectional view taken on line B—B in FIG. 3.

The circumferential walls 7a and 7b extend from the axial edges of the narrow inner annular portion 6 to the respective axial edges of the wide outer annular portion 5 while inclining axially outwards as shown in FIG. 5.

As shown in FIG. 5, in the support ring 4 in its natural state not mounted on the wheel rim 3, the axial width wo of the outer circumferential surface 4a is preferably set in the range of not less than 20%, more preferably more than 30%, but not more than 80%, more preferably less than 60% of the axial width BW of the belt 2g.

The axial width wi of the inner circumferential surface 4b is determined by the undermentioned angles alpha and beta.

In the cross section of the support ring 4 including the rotational axis, the angles alpha and beta are both set in the range of less than 90 degrees, preferably less than 89 degrees, more preferably less than 85 degrees, but not less than 50 degrees, preferably more than 65 degrees.

Here, the angle alpha is between the outer circumferential surface 4a and a first straight line K1 drawn between the axial edges EU1 and ED1 of the surfaces 4a and 4b, respectively. The angle beta is between the outer circumferential surface 4a and a second straight line K2 drawn between the axial edges EU2 and ED2 of the surfaces 4a and 4b, respectively.

If the difference between the angles alpha and beta is large and/or one of the angles is 90 degrees or more, when the tire goes flat, the support ring 4 is subjected to a vertical load, and around the vertical axis a moment M is produced to rotate the support ring 4 and stress concentration is liable to occur on one side of the support ring 4.

Therefore, the difference between the angle alpha and angle beta should be less than 20 degrees, preferably less than 10 degrees, more preferably not more than 5 degrees, still more preferably not more than 2 degrees namely substantially zero degree. In other words, it is preferable that the overall cross sectional shape or profile of the annular body is a trapezoid, especially preferably an isosceles trapezoid.

Figure 6:
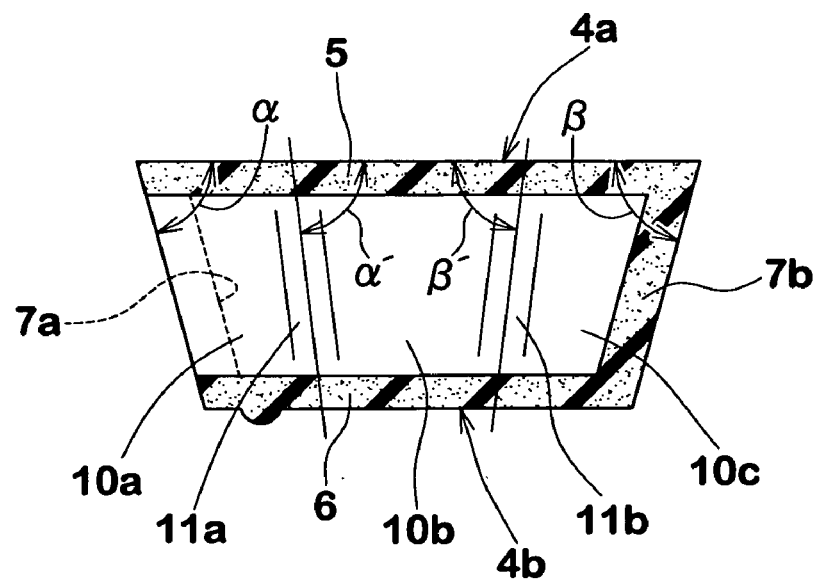
FIGS. 6, 7 and 8 are cross sectional views each showing a modification of the support ring shown in FIG. 5.

The above-mentioned oblique parts 11a and 11b can be formed perpendicularly to the surface 4a as shown in FIG. 5. But, as shown in FIG. 6, the oblique parts can be inclined towards axially outwardly at the angles (alpha') and (beta') the same or smaller than the angles (alpha) and (beta), respectively, to further increase the lateral rigidity.

In FIG. 5, the axially outer surfaces of the circumferential walls 7a and 7b which collectively form the side face of the support ring, are shaped straight in the cross section including the rotational axis. Further, the circumferential walls 7a and 7b have a substantially constant thickness (for example 8 mm).

Figure 7:
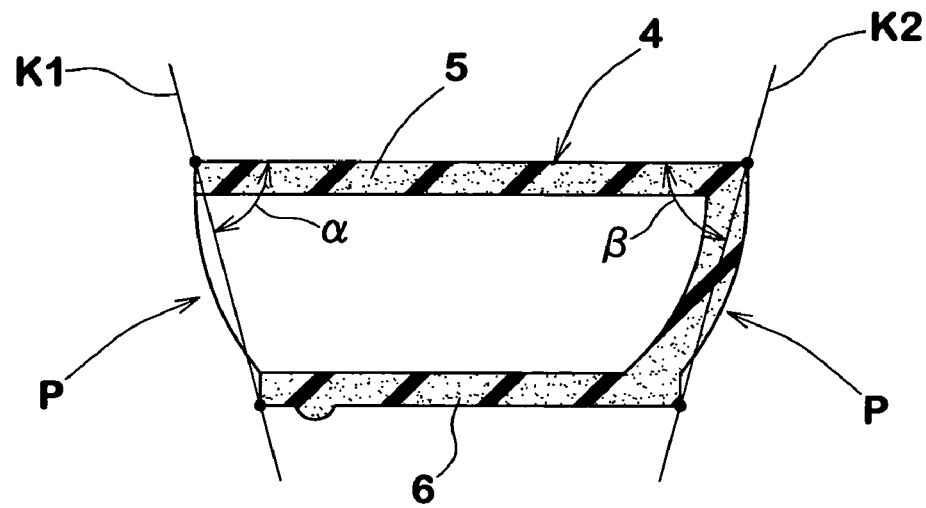
Figure 8:
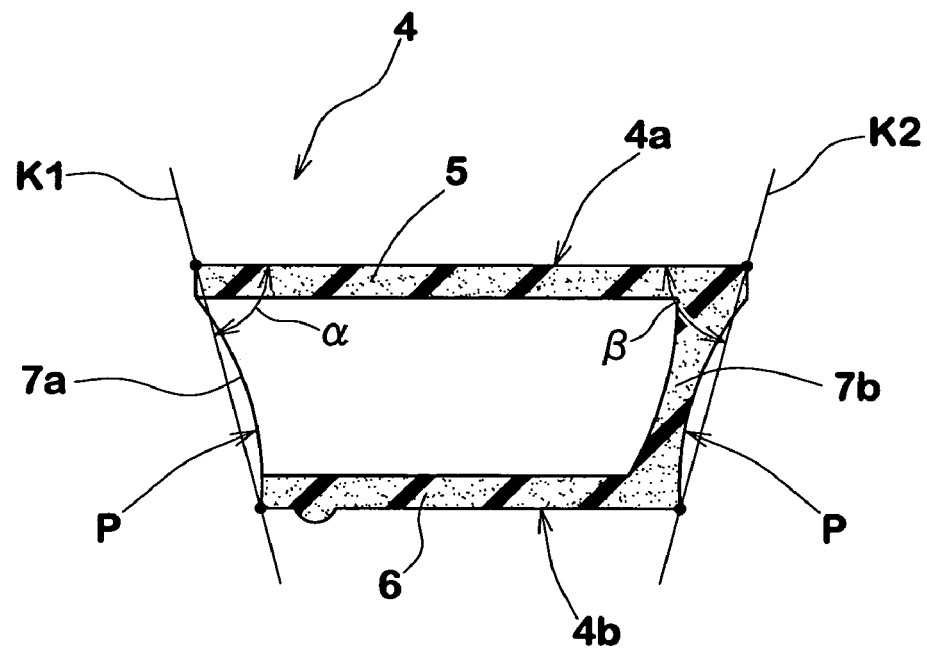

FIGS. 7 and 8 show modifications of the support ring 4, wherein the axially outer surfaces of the circumferential walls 7a and 7b are concave and convex, respectively. In FIG. 7, as the axially inner surfaces is almost parallel to the axially outer surfaces, the wall thickness is almost constant. In FIG. 8, as the axially inner surfaces is almost straight, the wall thickness is decreased in the middle of the height.

Figure 9A:
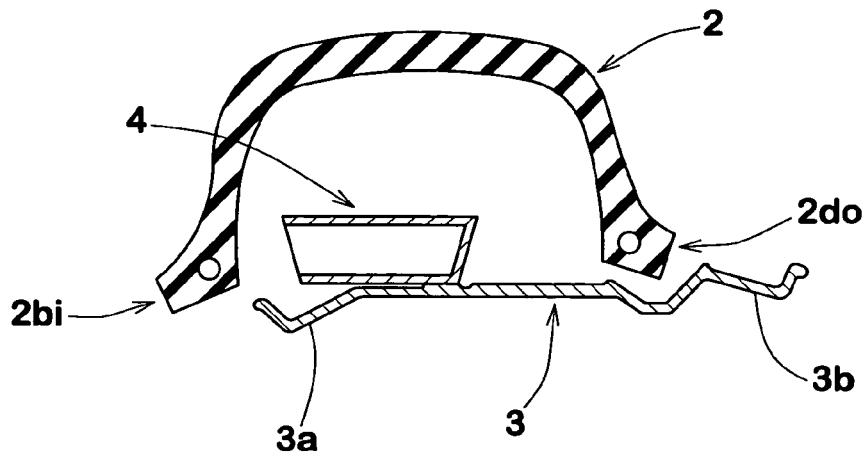
FIGS. 9(a), 9(b) and 9(c) are diagrammatic cross sectional views showing the process of mounting the tire and support ring on the wheel rim.
Figure 9B:
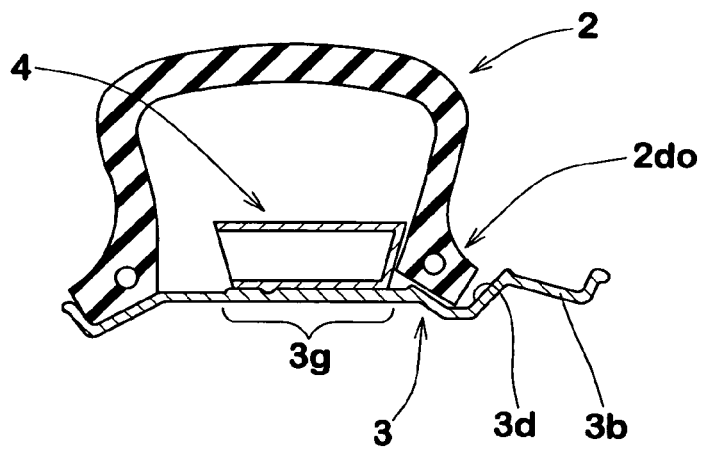
Figure 9C:
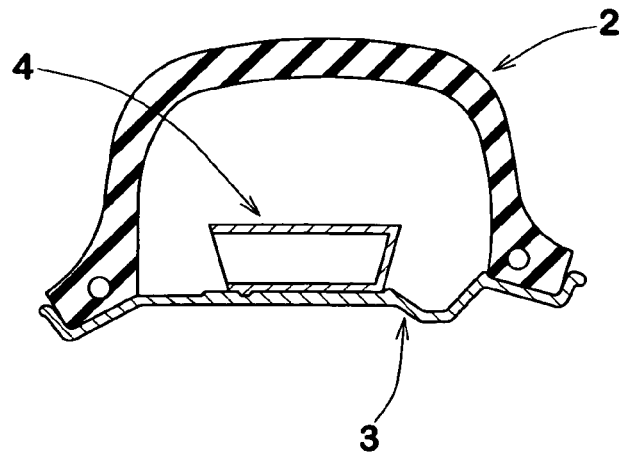

FIGS. 9(A) to (C) show the process of mounting the tire 2 and support ring 4 on the wheel rim 3.

First, the support ring 4 is put inside the tire 2, and into the center holes thereof, the wheel rim 3 is inserted from the first bead seat 3a side. AS the outside diameter of the first bead seat 3a is small, the first bead seat 3a can pass over the support ring 4 without difficulty. Also the second bead portion 2do can reach to the rim well 3d without difficulty. By sliding the support ring 4 towards the second bead seat 3b, the support ring 4 is set in the mounting portion 3g. The first bead portion 2di passes over the flange 3af of the first bead seat 3a by force, and it is seated on the first bead seat 3a. By applying tire pressure, the second bead portion 2do is seated on the second bead seat 3b, while partially placing the second bead portion 2do in the rim well 3d to pass over the hump at the axially inner end of the second bead seat 3b.

To prevent wear and heat generation and thereby to increase the runflat distance, lubricant is preferably applied to the surface 4a of the support ring 4 and/or the inner surface of the tread portion 2a.

Comparison Tests

Support rings having the specifications shown in Table 1 were made and assembled together with the identical tire and wheel rim. The pneumatic tire had a size 225-680R460A99W and the structure shown in FIG. 1(a). The wheel rim had a size 225×460A and the structure shown in FIG. 1(a). The material of the support ring was polyurethane.

The following Durability test and steering stability test were conducted.

Durability test:

The support ring and tire were mounted on the wheel rim, and the tire valve's core was removed to decrease the tire pressure to 0 kPa. Then, using a 1700 mm diameter test drum, the wheel assembly with the deflated tire was run at a speed of 100 km/H under a tire load of 4.9 kN, until the support ring was broken. The obtained runflat distance in kilometer is shown in Table 1.

Runflat steering stability test:

The wheel assembly with the deflated tire was attached to a Japanese passenger car (4000 cc engine, vehicle weight 2 tons) as its right rear wheel. Then, the test car was run at a speed of 80 km/Hr in a test course, and the test driver evaluated the steering stability into ten ranks, wherein the larger the rank number, the better the steering stability.

From the test results, it was confirmed that the runflat steering stability and durability can be improved without increasing the weight in substance.

TABLE 1

Figure 10A:
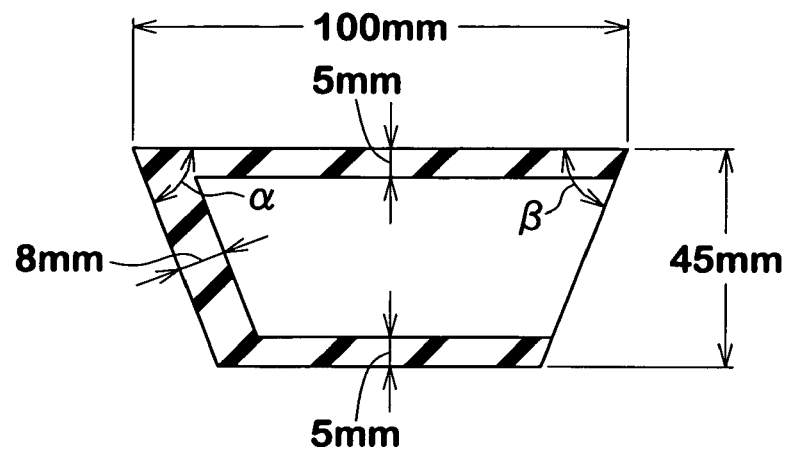
FIGS. 10(a), 10(b) and 10(c) are cross sectional views of support rings used in the undermentioned comparison tests.
Figure 10B:
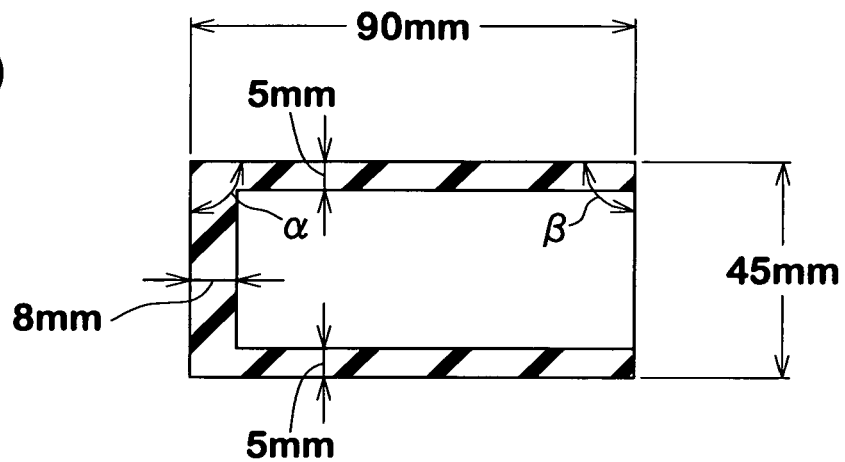
Figure 10C:
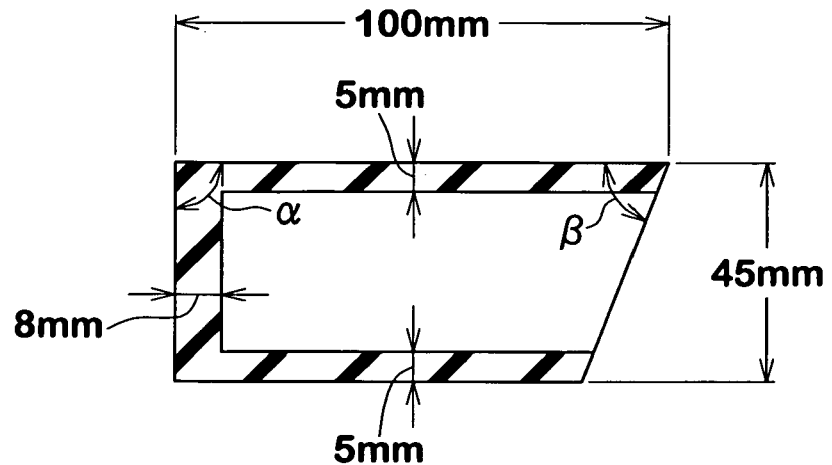
Figure 11:
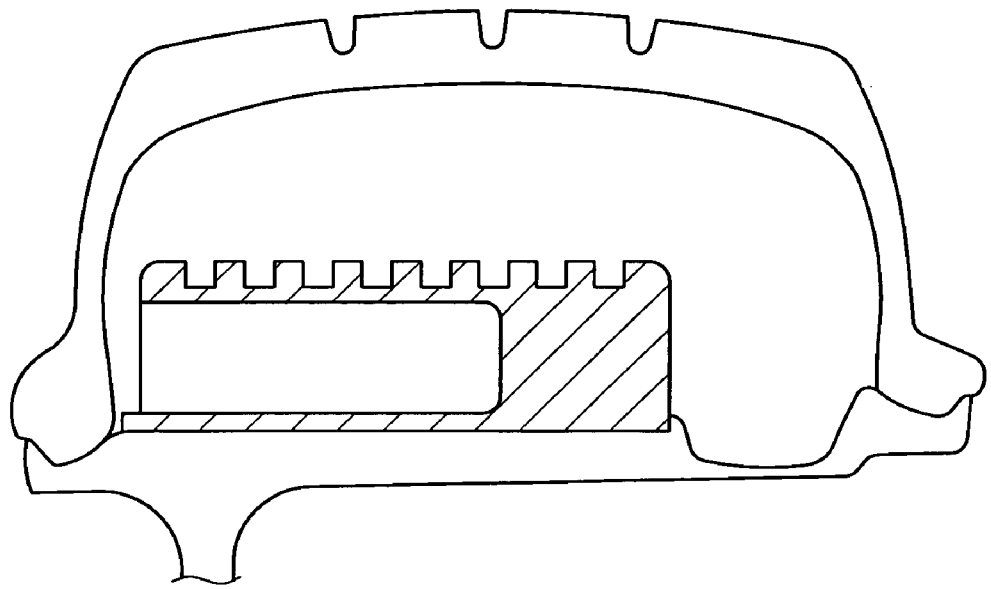
FIG. 11 is a cross sectional view of a prior art support ring.

| Support ring | Ex. 1 | Ex. 2 | Ref. 1 | Ref. 2 |
|---|---|---|---|---|
| cross sectional shape | FIG. 10 (a) | FIG.10 (a) | FIG. 10 (b) | FIG. 10 (c) |
| angle alpha (deg.) | 77 | 84 | 90 | 90 |
| angle beta (deg.) | 77 | 77 | 90 | 77 |
| supporting wall portion | FIG. 4 | FIG. 4 | FIG. 4 | FIG. 4 |
| steering stability | 7 | 7 | 5 | 7 |
| weight (%) | 101 | 103 | 100 | 106 |
| Durability ([km]) | 110 | 110 | 95 | 105 |

The support ring 4 may be reinforced with cords and/or fibers embedded therein although the above-mentioned examples are not reinforced. For example, in order to prevent dislocation of the support ring, the inner annular portion 6 can be reinforced with a layer of cords which are arranged side by side in the axial direction and extend in the circumferential direction. Further, in order to prevent the outer annular portion 5 from being broken or torn, the outer annular portion 5 can be reinforced with a reinforcing cord layer similar to above, or fabric or short fiber, etc.

As to the supporting wall portion 7, the traverse wall can be formed in a wavy configuration made up of smooth curves instead of the zigzag configuration made up of straight segments. Further, a straight configuration may be employed though such is inferior to the zigzag and wavy configurations in rigidity.

In the above-mentioned embodiment, the support ring has the inner circumferential surface 4b provided with only the protrusion 4c. However, it is also possible to provide further protrusion(s) or groove(s) to fit to the surface of the wheel rim.

In the above-mentioned embodiment, the support ring is combined with the unconventional tire and rim having different bead diameters. But, it is not always necessary. the support ring may be combined with a conventional tire and rim combination as far as the support ring can fit to a wheel rim.

The invention claimed is:

1. A support ring for a runflat tire system comprising an annular body made of an elastic material having a radially inner circumferential surface which fits to a mounting portion of a wheel rim when mounted thereon, and a radially outer circumferential surface which comes into contact with the inside of the tread portion of a pneumatic tire mounted on the wheel rim when the tire is deflated and loaded, wherein the outer circumferential surface is wider in the axial width than the inner circumferential surface, and
   in a cross section including the central axis of the support ring, the outline of the annular body is substantially a trapezoidal shape of which two parallel long and short sides are the outer and inner circumferential surfaces, respectively, and the remaining two sides are inclined at acute angles with respect to the long side, and said annular body comprising:
   a radially outer wide annular portion whose radially outer surface defines said outer circumferential surface;
   a radially inner narrow annular portion whose radially inner surface defines said inner circumferential surface; and a supporting wall portion between the radially outer and inner annular portions, wherein
the supporting wall portion comprises circumferential walls and traverse walls,
the circumferential walls extend radially outwardly from the axial edges of the radially inner annular portion to the axial edges of the radially outer annular portion, while inclining axially outwards to define said trapezoidal profile, and
the traverse walls each extend from one of the circumferential walls on one side of the annular body to one of the circumferential walls on the other side of the annular body,
said supporting wall portion extends continuously in the circumferential direction of the support ring in a zigzag fashion, wherein
the circumferential walls on one side of the annular body are staggered with respect to the circumferential walls on the other side of the annular body,
each of the circumferential walls extends in parallel with the circumferential direction of the support ring,
the transverse walls are alternately inclined in the same direction with respect to the axial direction of the support ring so that each transverse wall has an overall inclining direction, and
each of the transverse walls is made up of at least three axial parts and at least two oblique parts therebetween arranged in a zigzag fashion, wherein said at least two oblique parts are inclined to the same direction as the overall inclining direction of the transverse wall.

2. The support ring according to claim 1, wherein the annular body is provided on both sides thereof with a plurality of hollows of which openings on one side and openings on the other side are staggered.

3. The support ring according to claim 2, wherein the hollows are each gradually decreased in sectional area from the opening to the bottom of the hollow.

4. The support ring according to claim 2, wherein the hollows are each gradually decreased in the circumferential width from the opening to the bottom of the hollow.

5. The support ring according to claim 1, wherein said elastic material has a hardness of from 30 to 70, wherein the hardness is a durometer type-D hardness measured according to Japanese Industrial Standard JIS-K6253 at a temperature of 23° C.±2° C.

6. The support ring according to claim 1, wherein the angle of said overall inclining direction of the transverse wall is in a range of from 10 to 15 degrees with respect to the axial direction, wherein the angle of the overall inclining direction is that of a straight line drawn between the axial ends of the transverse wall.

7. The support ring according to claim 1, wherein said at least two oblique parts have an angle in the range of about 40 to about 50 degrees with respect to the axial direction.

8. A runflat tire system comprising a pneumatic tire, a wheel rim on which the tire is mounted and a support ring as defined in claim 1 mounted on the rim to be placed inside the tire.

* * * * *